United States Patent [19]

Garrett et al.

[11] Patent Number: 5,268,022

[45] Date of Patent: Dec. 7, 1993

[54] GAS SEPARATION METHOD AND APPARATUS

[75] Inventors: Michael E. Garrett, Woking; John B. Gardner, Reigate, both of England

[73] Assignee: The BOC Group plc, Windlesham, United Kingdom

[21] Appl. No.: 847,823

[22] Filed: Mar. 6, 1992

[30] Foreign Application Priority Data

Mar. 7, 1991 [GB] United Kingdom ............... 9104875

[51] Int. Cl.$^5$ .................................. B01D 53/04
[52] U.S. Cl. ........................................ 95/98; 95/119;
   95/130; 95/902; 96/126; 96/130; 96/132
[58] Field of Search ............ 55/25, 26, 28, 31, 33,
   55/58, 62, 68, 74, 75, 179, 180, 208, 267-269,
   387, 389

[56] References Cited

U.S. PATENT DOCUMENTS

| | | | |
|---|---|---|---|
| 2,790,505 | 4/1957 | Dow | 55/179 X |
| 3,172,745 | 3/1965 | Needham et al. | 55/389 X |
| 3,172,748 | 3/1965 | Feinleib et al. | 55/389 X |
| 3,369,874 | 2/1968 | Wilhelm | 55/389 X |
| 4,026,680 | 5/1977 | Collins | 55/26 |
| 4,165,972 | 8/1979 | Iles et al. | 55/179 X |
| 4,444,727 | 4/1984 | Yanagihara et al. | 55/180 X |
| 4,696,681 | 9/1987 | Lloyd-Williams | 55/28 |
| 4,898,599 | 2/1990 | Settlemyer | 55/28 |
| 4,950,311 | 8/1990 | White, Jr. | 55/25 |
| 4,954,146 | 9/1990 | Garrett et al. | 55/208 X |
| 5,118,331 | 6/1992 | Garrett et al. | 55/269 |

FOREIGN PATENT DOCUMENTS

| | | |
|---|---|---|
| 0468665 | 1/1992 | European Pat. Off. . |
| 3139781 | 4/1983 | Fed. Rep. of Germany ........ 55/180 |
| 54-109667 | 8/1979 | Japan .................................. 55/179 |
| 55-061915 | 5/1980 | Japan .................................... 55/25 |
| 55-092122 | 7/1980 | Japan .................................. 55/179 |
| 60-239303 | 11/1985 | Japan .................................. 55/208 |
| 61-164622 | 7/1986 | Japan .................................. 55/208 |
| 62-123001 | 6/1987 | Japan .................................. 55/179 |
| 1-015115 | 1/1989 | Japan .................................. 55/179 |
| 1-299622 | 12/1989 | Japan .................................. 55/179 |
| 3-094809 | 4/1991 | Japan .................................. 55/179 |
| 90/10491 | 9/1990 | PCT Int'l Appl. .................... 55/28 |
| 0955990 | 9/1982 | U.S.S.R. .............................. 55/179 |
| 1530603 | 11/1978 | United Kingdom . |
| 1530604 | 11/1978 | United Kingdom . |

*Primary Examiner*—Robert Spitzer
*Attorney, Agent, or Firm*—Coleman R. Reap; Larry R. Cassett

[57] ABSTRACT

A pressure swing adsorption plant for the separation of gas mixtures includes at least one pressure vessel containing an adsorbent bed that is able preferentially to adsorb at least one component of the gas mixture. The pressure vessel has an inlet at its top for the feed gas mixture, an outlet at its bottom for non-adsorbed gas and at least one heat conductive member containing a liquid medium arranged within the bed such that, in operation, heat is able to be conducted by convection through the liquid from a region of maximum temperature at or near the bottom of the bed to a region of minimum temperature at or near the top of the bed.

14 Claims, 3 Drawing Sheets

GAS SEPARATION METHOD AND APPARATUS

TECHNICAL FIELD

This invention relates to a gas separation method and apparatus. In particular, it relates to a method and apparatus for separating a gas mixture by pressure swing adsorption (PSA).

BACKGROUND OF THE INVENTION

The PSA method has been described as being adiabatic, that is to say a process which occurs without loss or gain of heat. Accordingly, the end-to-end temperature of each adsorbent bed used to perform the PSA process is predicted by theory to be uniform. Each active particle of adsorbent adsorbs heat and rises in temperature during adsorption. During desorption, the particle releases heat and hence falls in temperature. It is therefore to be expected that at steady state, the quantity of fluid adsorbed by a particle equals the quantity desorbed and hence the quantity of heat generated during the adsorption equals the loss of heat during desorption. Since each particle can be identified as a separate adiabatic zone, it might be predicted that temperature differentials within a PSA bed should not occur.

In practice, however, as is well known, such temperature differentials are created, particularly when using a bed of zeolite molecular sieve to separate air, the sieve adsorbing nitrogen in preference to oxygen. At steady state, which is typically established after say 24 or 36 hours of continuous operation, there is found to be a temperature gradient, with the temperature of the bed along its longitudinal axis falling from the bottom or feed gas end of the bed to a minimum at a point relative near that end and then rising again to a maximum which is at or near to the top end of the bed. A minimum temperature of less than minus 50° C. and a maximum temperature of at least 30° C. (i.e. above ambient temperature) have been observed. The conclusion to be drawn is that in a bottom section of the bed there is a net loss of heat in each operating cycle, while in a top section there is a net generation of heat. The creation of the temperature differential within the bed can adversely affect the performance of the PSA method. In particular, in the example of the separation of air using a zeolite sieve, although the adsorption capacity of the sieve increases with decreasing temperature, adverse kinetic effects occur so as to reduce its overall performance. Indeed, a sieve optimised for room temperature does not perform as well at lower temperatures.

Various methods have been proposed to reduce the magnitude of an internal temperature differential that is created within a PSA bed. First, it has been proposed that the gas mixture to be separated be heated by external means. Such a method is described in GB-A-1 530 603. In addition, or alternatively, it has been proposed in GB-A- 1 530 604 to transfer heat to the lower temperature portion of the bed from both the top and bottom of the bed by metal-to-adsorbent conduction of heat. To this end, metal rods extend vertically upwards through the bed from its bottom to near its top. The rods may, for example, be of copper or other heat conductive metal.

SUMMARY OF THE INVENTION

It is the aim of the present invention to provide a method and apparatus which provides an alternative means of reducing such a temperature differential.

According to the present invention there is provided a method of separating a gas mixture by pressure swing adsorption, in which the gas mixture to be separated is fed to the top of a bed of adsorbent capable of preferentially or more rapidly adsorbing at least one component of the gas mixture, the gas mixture flows through the bed from the top to the bottom thereof, whereby at least one component of the gas mixture is preferentially or more rapidly adsorbed, the bed is regenerated by desorbing gas at reduced pressure from the adsorbent and causing such desorbed gas to flow from the bed countercurrently to the flow of the feed gas, whereby, on repeated performance of such adsorption and desorption steps, a temperature differential is created between a maximum temperature region at or near the bottom of the bed and a minimum temperature near the top of the bed, and heat is conducted by convection from said maximum temperature region to said minimum temperature region through a liquid medium held in at least one elongate member within the bed.

The invention also provides apparatus for separating a gas mixture, including at least one vessel containing a bed of adsorbent that is able preferentially or more rapidly to adsorb one component of a gas mixture to be separated, said vessel having an inlet at its top for the feed gas mixture, an outlet at its bottom for non-adsorbed gas, and at least one elongate heat conductive member containing a liquid medium, said member or members being disposed in the bed such that in operation heat is able to be conducted by convection through the liquid from a maximum temperature region at or near the bottom to a minimum temperature region near the top thereof.

The method and apparatus according to the invention are particularly suitable for separating air using a zeolite molecular sieve, which adsorbs nitrogen in preference to oxygen. They can also, however, be used in the separation of air using a carbon molecular sieve which adsorbs oxygen more rapidly than nitrogen.

Preferably, there are two or three adsorbent beds each adapted to perform in accordance with the invention the same cycle of operations out of phase with one another. Thus, if there are n beds, where n is an integer, the phase relationship is typically 360/n°.

The liquid medium is, for example water. If desired, the water or another liquid medium includes a substance dissolved therein to lower its freezing point. Alternatively, the liquid medium may be an organic liquid that has a freezing point below 0° C., for example a ketone or an alcohol. Preferably each heat conductive member has fins so as to enhance transfer of heat between it and the adsorbent. Each elongate member is preferably a right cylinder closed at both its ends. Typically, from 2 to 20 elongate members are disposed in the or each bed, depending on its volume.

An adsorbent bed is conventionally arranged with its inlet for feed gas at the bottom and its outlet for non-adsorbed gas at the top. In this invention, the positions of the feed gas inlet and the outlet for non-adsorbed gas are inverted. It is then possible to use the principle of convective heat transfer between hot and cold regions in the adsorbent bed to reduce the magnitude of the temperature difference therebetween.

BRIEF DESCRIPTION OF DRAWINGS

The method and apparatus according to the invention are now described by way of example with reference to the accompanying drawings, in which.

DETAILED DESCRIPTION OF THE INVENTION

Figure 1:
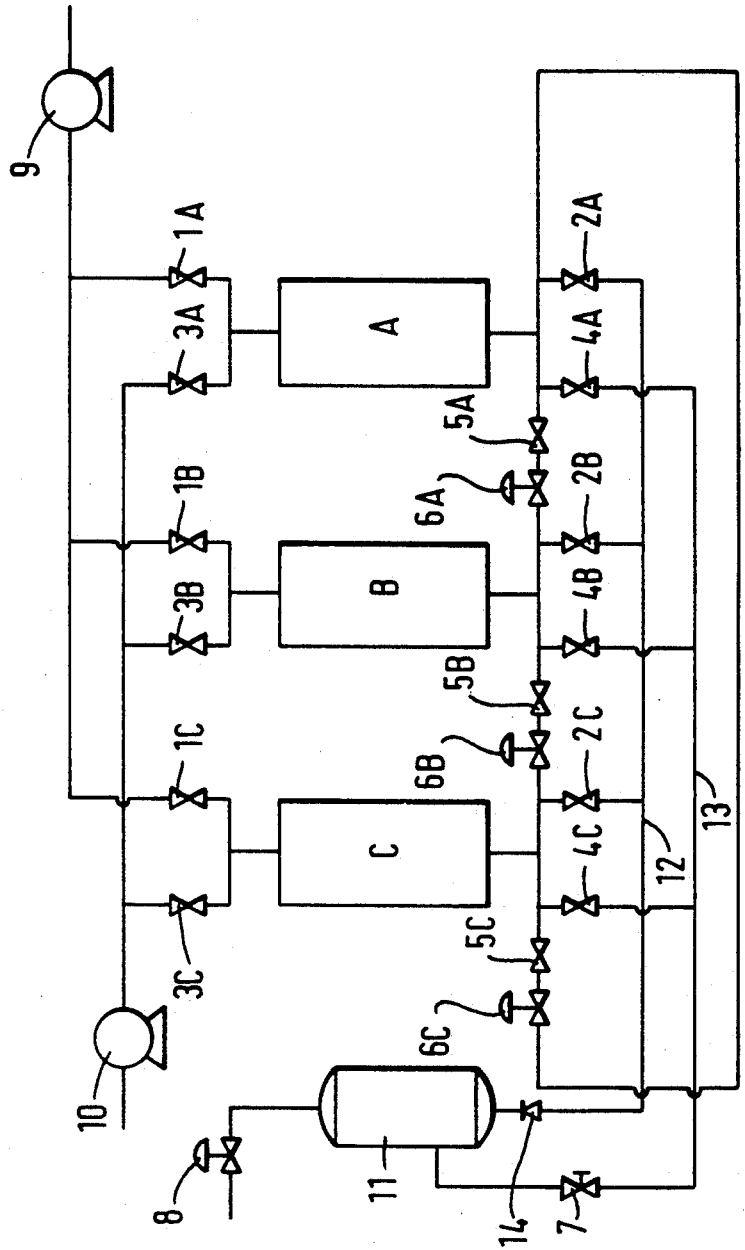
FIG. 1 is a flow diagram of an apparatus for separating air by pressure swing adsorption.

The apparatus illustrated in FIG. 1 of the drawings is used to perform a PSA method comprising eight sequential steps referred to hereinafter as steps 1 to 8 to separate air. Each of three adsorption columns or vessels A, B and C contains an adsorbent capable of selectively adsorbing nitrogen in preference to oxygen.

In step 1, valves 1A and 2A are opened and air, pressurised by a blower 9, is introduced to the first column A from its upper or feed end. As the air flows down the column A, it becomes progressively richer in oxygen, thus enabling a product gas consisting of oxygen-enriched air to be withdrawn from the bottom of the column A. The product gas flows through check valve 14 and into a tank 11 via a pipeline 12. During this step, the adsorption pressure in the first column A is normally maintained above atmospheric pressure.

Also in step 1, valves 3B and 5B are opened to supply gas enriched in oxygen from the effluent or bottom end of the third column C to the bottom or effluent end of the second column B. The thus-introduced oxygen gas is discharged by means of a vacuum pump 10 after it purges the inside of the second column B countercurrently to the direction of air flow therethrough. The third column C is further depressurised by introducing oxygen enriched gas therefrom to the second column B. The rate of supply of the oxygen enriched gas from the third column C is controlled by means of a flow control valve 6B.

In step 2, the valves 3B and 5B are closed and valves 4B and 3C are opened, thus introducing product gas from the tank 11 through line 13 to the effluent end of the second column B, which had been purged, to pressurise it. In the meantime, the first column A is continuously producing product gas from the bottom or effluent end thereof as in step 1 while the third column C is being evacuated by means of the vacuum pump 10. If desired, the pressurisation of the second column B need not be effected by the supply of the product gas from the tank 11.

In step 3, the valves 2A and 4B are closed and valve 1B is opened thereby causing the gas within the first column A, together with the feed air, to flow from the top or feed end of the first column A to the top or feed end of the second column B, hence countercurrently depressurising column A. For all or part of this period the valves 2A and 2B may be open to introduce the oxygen enriched gas from the bottom or effluent end of the column A to the bottom or effluent end of the column B. Step 3 typically takes about 1 to 7 seconds. When depressurisation is effected only by introducing gas from the top or feed end of the column A to the top or feed end of the column B, it takes about 3 to 5 seconds. By introducing gas from the bottom or effluent end of the column A to the bottom or effluent end of the column B simultaneously with the "feed end-to-feed end" depressurisation, the duration of the operation may be reduced to 1 to 2 seconds. In step 4, valve 1A is closed and valve 5C is opened causing oxygen enriched gas to flow from the bottom or effluent end of the column A to the bottom or effluent end of column C. Column C is purged countercurrently using this gas, the gas being vented from the system by the operation of the vacuum pump 10.

Also in step 4, the first column A is further depressurised while introducing the oxygen enriched gas to the third column C. During this operation, the rate of supply of the purge gas from the column A to column C is controlled by means of a flow control valve 6C. Although the purge operation is needed to obtain an oxygen enriched product of chosen high oxygen concentration, the rate of supply of the purge gas is not critical. The rate of supply of the purge gas may be determined by the final pressure within the column which is depressurised to supply the purge gas.

In this step 4, the final reduced pressure within the first column A is normally set at or near to atmospheric pressure. During this step, the valve 2B is kept open so that product gas flows out of the effluent or bottom end of the second column B.

Step 5 has two parts called herein 'step 5-1' and step 5-2. In step 5-1, valve 5C is closed and valve 3A is opened and the gas from the feed end of column A evacuated by operation of the vacuum pump 10 thereby regenerating the adsorbent by desorbing the nitrogen adsorbed therein. The vacuum pump typically creates a pressure in the range of 250 to 350 Torr.

While column A is being regenerated in step 5-1, product oxygen-rich gas is being passed from the tank 11 to the bottom or effluent end of column C, in which the purging step has already been completed, by closing valve 3C and opening valve 4C. Column C is thus pressurised. Simultaneously, column B still continues to produce a product oxygen-enriched gas which flows out of the bottom or effluent end thereof. Part of the product gas ($O_2$) discharged from column B may be introduced to bottom or effluent end of the column C. In step 5-2, valves 2B and 4C are closed and valve 1C is opened to introduce the gas from the feed end of column B to the feed end of column C, together with the feed air, thereby depressurising column B. Alternatively, while this operation is being carried out, valves 2B and 2C may be opened to introduce oxygen enriched gas from the bottom or effluent end of column B to the bottom or effluent end of column C. Column A is continuously evacuated during this period.

In step 6, valve 1B is closed and valve 5A is opened thereby introducing oxygen enriched gas from the bottom of the column B to the bottom or effluent end of column A so as to purge column A countercurrently, gas being withdrawn from the top of the column A by operation of the vacuum pump 10. Both the valves 1C and 2C remain open during this step, so that air flows into the top or feed end and product gas flows out of the effluent end of column C. The rate of supply of oxygen-enriched gas from column B to column A is controlled by flow control valve 6A.

In step 7, valves 3A and 5A are closed and valve 4A is opened to introduce the product gas from the tank 11 to the bottom of effluent end of the previously purged column A, thereby pressurising column A with product gas. The rate of introduction of the product gas is controlled by flow control valve 7. This step makes it possible to obtain a product gas of uniform low nitrogen concentration (e.g. about 1000 ppm).

The final pressure within column A in this pressurisation step is preferably from about 250 to 450 Torr higher than the corresponding final pressure in the purging step 6. At the same time, valve 3B is opened to evacuate column B by operation of the vacuum pump 10 while column C is continuously separating air flowing in through its top or feed end with the withdrawal of product gas from the effluent or bottom end thereof. When the breakthrough front of nitrogen adsorption reaches the effluent end of column C, the adsorbing step (step 7) is completed. As a result, a relatively large amount of enriched oxygen gas, the concentration of which is lower than the oxygen concentration in the product gas but still considerably high is left in the gaseous portion at the effluent end of column C. In step 8, valves 2C and 4A are closed and valve 1A is opened to introduce gas from the top or feed end of the column C to the top or feed end of column A and feed air is simultaneously introduced into the top of column A, thereby pressurising column A.

The flow of gas from the feed end of column C to the feed end of column A continues until the pressure within column C becomes substantially equal to that in column A. The introduction of the gas from the top or feed end of column C to the top or feed end of column A enables the rate of supply of the feed air to be reduced, thus increasing the effective oxygen recovery rate. In this step, it is unnecessary to control the depressurisation speed in column C, the rate of supply of the feed air or the pressurisation speed in column A. Step 8 is completed within a short period of time, i.e. from about 1 to 7 seconds, preferably from about 3 to 5 seconds.

For all or part of the period of step 8, valves 2C and 2A may be open to introduce the oxygen enriched gas from the bottom or effluent end of column C to the bottom or effluent end of column A, thereby pressurising column A. This enables the duration of step 8 to be reduced to about 1 to 2 seconds.

Throughout step 8, column B is continuously evacuated.

The flow is periodically switched among the adsorption columns A, B and C so as to repeat the above steps on a cyclic basis. The product gas is continuously taken out from the tank 11 through valve 8 during the operation of the process.

Figure 2:
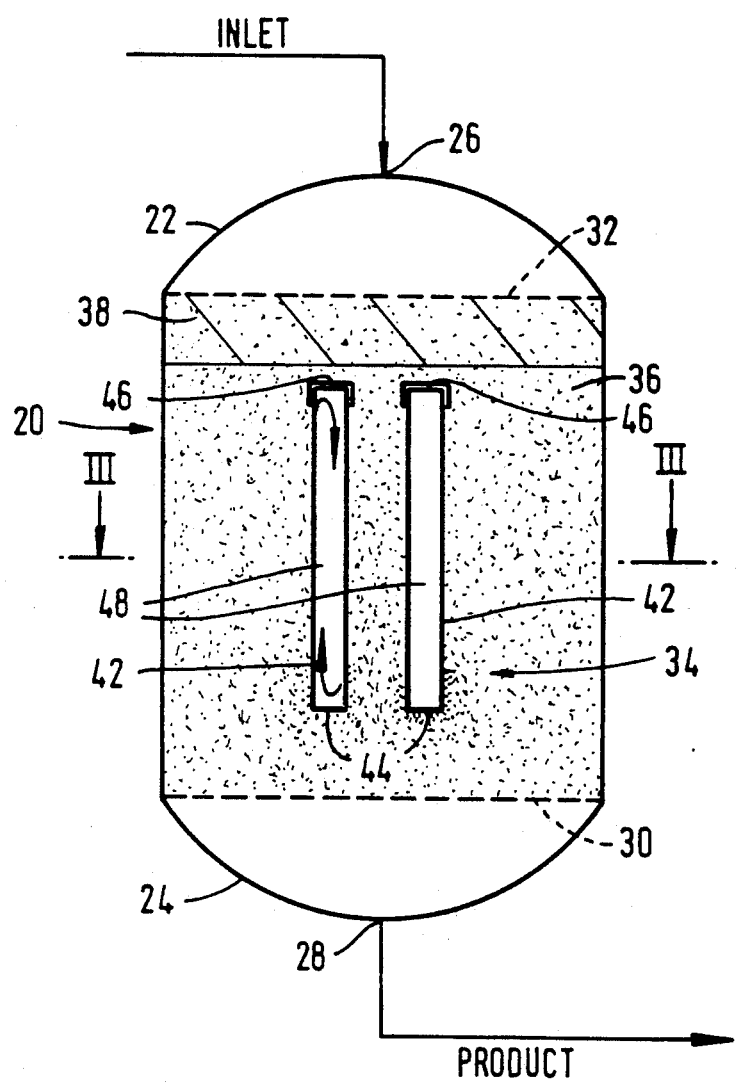
FIG. 2 is a schematic drawing of an adsorption vessel for use in the apparatus shown in FIG. 1, the drawing showing the use of heat conductive members in accordance with the invention.
Figure 3:
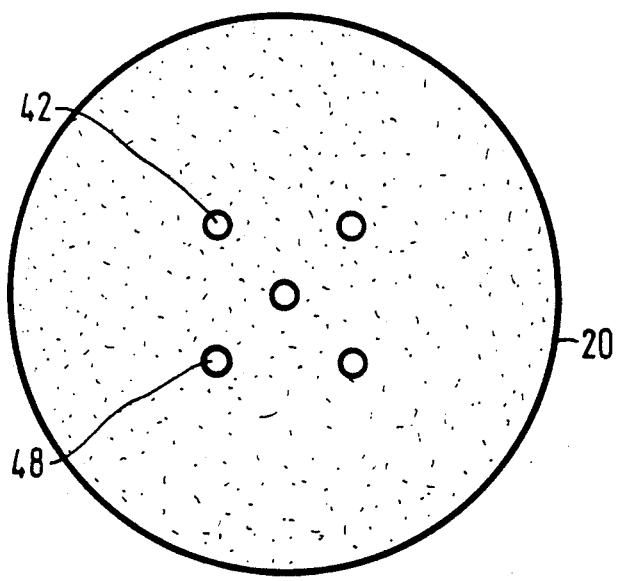
FIG. 3 is a section through the line II—II in FIG. 2.

Each of the adsorption vessels A, B and C is generally as shown in FIGS. 2 and 3. The vessel, indicated by the reference numeral 20 is generally cylindrical in shape but has dished ends 22 and 24. A gas port 26 is formed in dished end 22, and a similar gas port 28 in the dished end 24. The gas ports 26 and 28 are coaxial with the longitudinal axis of the vessel 20. A support grid 30 is located at the bottom of the vessel 20. There is a similar retaining grid 32 located at the top of the vessel 20. Both the grids 30 and 32 are perforate to enable gas to flow freely between the ports 26 and 28. The grid 30 supports a bed 34 of adsorbent particles. The bed 34 comprises a lower layer 36 of an adsorbent such as a synthetic zeolite (5A) or natural zeolite that is able selectively to adsorb nitrogen and carbon dioxide preferentially to oxygen. On top of the layer 36 is a layer 38 of adsorbent or desiccant particles, for example of alumina, which are able to adsorb water from the incoming air. The depth of the layer 36 is preferably at least twice the depth of the layer 38.

In those steps of the process described with reference to FIG. 1, in which air is fed to the vessel 20 (through the port 26) water vapour is first adsorbed from the air in the layer 38, and then other constituents of the air are adsorbed by the layer 36 in preference to oxygen, to enable a product gas stream rich in oxygen to be withdrawn through the port 26. As described with reference to FIG. 1, regeneration is effected by subjecting the bed 34 to a pressure lower than the adsorption pressure and causing desorbed gas to flow out of the vessel 20 in a direction countercurrent to the flow of the incoming air. Repeated and continuous performance of the cycle of operations described with reference to FIG. 1, over a prolonged period of time, say 24 or 36 hours, results in a generally steady state being reached with there being a temperature gradient extending between a minimum axial temperature which occurs (see FIG. 2) near the top of the layer 36 (typically from 33 to 66 cm from its interface with the layer 38) and a maximum axial temperature which occurs a similar distance from the bottom of the layer 36. In accordance with the invention, there extend vertically upwards from the horizontal plane including such maximum temperature point to the horizontal plane including such minimum temperature point a plurality of vertically disposed, right cylindrical, tubular, heat conductive members 42. As shown in FIG. 3, five such members may be employed. Typically, the spacing between adjacent members is in the order of 0.3 to 0.4 m. Each member is typically made of copper, brass or other heat conductive metal. Each member 42 is closed at both its lower end 44 and its upper end 46 and has an axial right cylindrical cavity 48 containing a liquid such as water with there being a small ullage space (not shown) between the liquid surface and the top of the cavity 48. If desired, the upper end 46 may take the form of a removable cap which makes a screw-threaded or other fluid tight engagement with the rest of the member 42. In addition, each member is preferably provided with axial heat conductive fins (not shown).

In use of vessels 20 as the columns A, B and C in the process described hereinabove with reference to FIG. 1, the members 40 each function to limit the temperature difference between their lower ends 44 and their upper ends 46. Heat is transferred from the surrounding adsorbent to each lower end 44, while heat flows from each upper end 46 to the surrounding adsorbent. This enables the water at the bottom of each cavity 48 to be at a higher temperature than the water at the top thereof. Accordingly, convention currents are set up inside the water in the cavities 48 which particularly enhances flow of heat from the lower end 44 to the upper end 46 of each member. As a result, the magnitude of the temperature differential between the adsorbent surrounding the ends 44 and that surrounding the ends 46 is kept in bounds, typically to less than 10° C.

We claim:

1. A method of separating a gas mixture by pressure swing adsorption comprising the steps of feeding the gas mixture downwardly through a bed of adsorbent which preferentially adsorbs at least one component of the gas mixture, thereby causing said at least one component of the gas mixture to be adsorbed, regenerating the bed by desorbing gas at reduced pressure from the adsorbent and causing such desorbed gas to flow from the bed countercurrently to the flow of the feed gas, whereby, on repeated performance of such adsorption and desorption steps, a temperature differential is created between a maximum temperature region at or near the bottom of the bed and a minimum temperature near the top of the bed, and conducting heat by convection from said maximum temperature region to said minimum temperature region through a liquid medium held in at least one elongate member within the bed.

2. A method as claimed in claim 1, in which the adsorbent is a zeolite molecular sieve that adsorbs nitrogen in preference to oxygen.

3. A method as claimed in claim 1 or claim 2, in which the liquid medium is water.

4. A method as claimed in claim 3, in which the water has dissolved in it a substance to lower its freezing point.

5. A method as claimed in claim 1 or claim 2, in which the liquid medium is an organic liquid having a freezing point below 0° C.

6. A method as claimed in claim 1 or claim 2, in which from 2 to 20 elongate members are disposed in said bed.

7. A method as claimed in claim 1 or claim 2, in which said at least one elongate member is a right cylinder closed at both its ends.

8. Apparatus for separating a gas mixture, including at least one vessel containing a bed of adsorbent that is able preferentially or more rapidly to adsorb one component of a gas mixture to be separated, said vessel having an inlet at its top for the feed gas mixture, an outlet at its bottom for non-adsorbed gas, and at least one elongate heat conductive member containing a liquid medium, said at least one heat conductive member being disposed in the bed such that in operation heat is able to be conducted by convection through the liquid from a maximum temperature region at or near the bottom to a minimum temperature region near the top thereof.

9. Apparatus as claimed in claim 8, in which the adsorbent is a zeolite molecular sieve that adsorbs nitrogen in preference to oxygen.

10. Apparatus as claimed in claim 8 or claim 9, in which the liquid medium is water.

11. Apparatus as claimed in claim 10, in which the water has dissolved in it a substance to lower its freezing point.

12. Apparatus as claimed in claim 8 or claim 9, in which the liquid medium is an organic liquid having a freezing point below 0° C.

13. Apparatus as claimed in claim 8 or claim 9, in which from 2 to 20 elongate members are disposed in said bed.

14. Apparatus as claimed in claim 8 or claim 9, in which said at least one elongate heat conductive member is a right cylinder closed at both ends.

* * * * *